3,455,864
BEARING
Gerald E. Dodson, 12551 El Roy Drive, Santa Ana, Calif. 92705, and Charles S. White, 35826 41st St., Palmdale, Calif. 93550
No Drawing. Filed Feb. 24, 1964, Ser. No. 347,044
Int. Cl. C08g 37/20, 51/08; F16c 33/20
U.S. Cl. 260—33.6                                      13 Claims

ABSTRACT OF THE DISCLOSURE

There is disclosed herein a bearing element having a low friction surface. At least the low friction surface portion of this element is formed of an organic resin matrix containing finely divided reinforcing material and heat conductive material. Embedded in this matrix is finely divided thermoplastic organic resin, preferably polytetrafluoroethylene (Teflon). The organic resin matrix may be phenolic resin, the reinforcing material, asbestos, which may be oil impregnated and the heat conductive material, graphite.

---

The subject matter of the present invention is an improved bearing element and method for manufacturing same. The invention has as its principal object the provision of the bearing element which can be manufactured at relatively low cost and yet which can be shaped to close tolerances and has excellent durability even under relatively high loads. Another object of the invention is to provide a method for manufacturing an improved low-cost durable bearing.

Briefly, the aforesaid objects are accomplished in accordance with the invention by a bearing element comprising finely divided lubricative thermoplastic resin dispersed in a reinforced heat conductive hard organic resin bonded matrix. More specifically, the invention comprehends bearing elements made by molding a uniform mixture of about 25%–40% by weight of a relatively hard organic resin, preferably phenolic resin, about 5% to 10% by weight powdered heat conductive material selected from the group consisting of graphite, the metal powders and mixtures thereof, preferably all graphite, about 30% to 50% by weight finely divided heat resistant reinforcing material, preferably asbestos, and about 20% to 25% finely divided dry lubricant at least the major portion of which and preferably all of which is a relatively soft thermoplastic organic resin of good inherent lubricity, ideally Teflon (polytetrafluoroethylene). Further, in accordance with the invention, such bearing elements can be manufactured by first forming a uniform mixture, with the proportions recited, of thermosetting resin, flake graphite, finely divided reinforcing material and dry lubricant, molding the mixture to the shape desired and heating to cure the resin. If an absorbent reinforcing material is used such as asbestos, which is preferred, after curing, the still hot bearing element can be immediately immersed in lubricating oil, whereby the oil is wicked into the element to substantially saturate the absorbent reinforcing material. In a completed such oil soaked bearing the absorbed oil will be about 1% to 2% of the total weight of the bearing. The resulting bearing comprises, in essence, a relatively hard reinforced, heat conductive thermosetting resin base matrix having dispersed therein a finely divided relatively soft thermoplastic dry lubricant, the absorbed oil lubricant, where used, supplementing the dry dispersed lubricant. The thermoplastic dry lubricant should, of course, have a softening temperature in excess of the temperature used to mold the mixture and cure the hard resin of the matrix. Teflon as the lubricant in combination with phenolformaldehyde as the matrix resin fulfills this and all other requirements eminently well.

Such a bearing has outstandingly excellent low friction and wear characteristics even under relatively high loads, and can be manufactured in a variety of shapes for a large number of bearing applications at low cost. The bearing elements can be easily machined where such is necessary to attain close tolerances. The hard matrix provides the excellent strength and durability and the thermoplastic lubricant at the bearing surface, in cooperation with the hard matrix, provides superior low friction characteristics particularly by reason of its being rubbed over the surface of the matrix by the bearing surface with which it is in sliding contact. Teflon flock, i.e. short random oriented fibers of Teflon is much preferred as the thermoplastic lubricant and albeit Teflon has notoriously poor bond strength, the Teflon does not create a strength problem in the bearings of this invention. The proportion ranges indicated for the various ingredients are important to the attainment of optimum results. With more or with less than from 25% to 40% hard resin for the matrix there is some loss in mechanical strength without any commensurate advantage. Likewise, if more or if less than from 30% to 50% reinforcing material is used there is some uncompensated sacrifice in useful bearing properties. With less than 30% there is significant loss of mechanical strength, and with more than 50% there is also loss in mechanical strength since at least 25% resin is required for good mechanical strength as indicated above, and with less than 5% graphite or less than 20% of the lubricant there is significant sacrifice in thermal conductivity and in lubricity as will be described. The thermal conductivity of the matrix imparted by the graphite is related to the low friction characteristics imparted by the thermoplastic lubricant under bearing operating conditions. That is, good thermal conductivity is essential not only for durability but also for optimum anti-friction characteristics. The best thermal conductivity commensurate with the attainment of other desirable characteristics is accomplished with from 5% to 10% graphite. With less than 5% there is significant loss in heat conductivity without commensurate gain in other characteristics and with more than 10% graphite the gain in thermal conductivity is not of such significance as to offset the loss in mechanical strength and other useful properties as results from required lessening of the amounts of other ingredients in the composition. As regards the lubricant, which is ideally Teflon flock, if less than 20% is used, there is detriment to the low friction characteristics and if there is more than 25% mechanical strength suffers.

In the preferred bearing the hard resin is phenolformaldehyde, the heat conductive powder is flake graphite, the reinforcing material is asbestos, and the lubricant is Teflon flock. The preferred proportions are 35% by weight phenolformaldehyde, 38% by weight asbestos, 5% by weight graphite, and 22% by weight Teflon. Where oil saturation of the asbestos is desired, the best results are attained by soaking in silicone oil or other high boiling point constant viscosity oil such as is currently marketed for engines and the like. The oil wicks into the asbestos at least at the surface of the bearing.

As alluded to above, the relatively hard resin for the matrix should preferably be a thermosetting resin and phenolformaldehyde is much preferred. Other resins can, however, be used, if desired. Examples are ureaformaldehyde, the melamine, epoxy and alkyd resins. Of course, the resin should provide good hardness in its cured state along with good bond strength. Also, it must be able to be molded and cured at a temperature less than the softening temperature of the lubricative thermoplastic resin included in the mix. Within these limitations it is possible to use a thermoplastic resin as the resin for the matrix; however, the thermoplastics are not nearly as good as the thermosets for the reasons that they have lesser mechanical strength, hardness and heat and wear resistance, all of which properties are important to the attainment of optimum results.

If desired, conductive metal powders, for example, aluminum, copper, or silver may be used in place of or in addition to the graphite as the heat conducting additive to the mix. For example, five percent graphite and five percent copper powder could be used if desired.

Examples of reinforcing materials which can be used in place of asbestos are vermiculite, mica, and fuller's earth.

As indicated above, Teflon flock is outstandingly superior as the thermoplastic lubricative additive to the mix. Teflon powder can be used in place of the flock material though with no advantage and with the disadvantage of less mechanical strength. Examples of other lubricative thermoplastics are nylon, the other polyfluorocarbons such as polytrifluoromonochloroethylene (Kel-F) and the polyalkylenes such as polyethylene, polypropylene and their copolymers. But for the practice of the present invention all of these substitutes are inferior to Teflon. Of course, it should be understood that the lubricative thermoplastic must have a softening temperature in excess of the temperature required to mold or cure hard resin of the matrix and it must be softer than the resin of the matrix. These are minimum requirements. Teflon is ideal not only because of its excellent inherent lubricity, its thermal properties including its high softening temperature and its extent of hardness as compared with the hard matrix but also because of its toughness and other physical properties which in cooperation with those of the matrix afford optimum bearing characteristics. A small amount, up to aproximately 10% by weight, of dry lubricant such as molybdenum disulfide, tungsten disulfide or boron nitride may be included in the bearing element if desired. Such inclusion can be made at the sacrifice of one or more of the other ingredients though for optimum strength heat conductivity and other characteristics affecting durability, it is desirable that the percentages of the other ingredients not be below the ranges set forth above. Of course, the graphite in the composition while included for the purpose of providing optimum heat conductivity nevertheless does also inherently serve as a dry lubricant. In practice there will seldom if ever be a need for additional lubricant.

The following specific example will serve to further illustrate the bearing and method of this invention. Liquid A stage phenolformaldehyde (60% solids dissolved or dispersed in wood alcohol or the like solvent), flake graphite of about 10 micron size, finely divided asbestos fibers and Teflon flock are thoroughly admixed in proportions to provide 35% by weight phenolformaldehyde, 38% by weight asbestos, 5% by weight graphite and 22% by weight Teflon upon evaporation of the solvent. As the much preferred sequence for mixing, the graphite should first be dispersed in the liquid phenolformaldehyde and this mixture allowed to stand until the graphite is thoroughly wetted by the liquid, about 24 hours being ample. Such mixture is then tumbled with the asbestos fibers and Teflon flock and heated to about 250° F. to B stage the phenolic resin, solvent being allowed to evaporate off during such tumbling operation. The dry B staged mix resulting from the tumbling operation is thereafter compression molded and cured by the application of from 1000 to 5000 pounds per square inch pressure and at a temperature sufficient to cure the resin to its C stage, about 350° F. After curing, additional strength may be imparted by postcuring at a temperature of about 350° F. for two to twenty-four hours. Then the bearing element can, if desired, be soaked in oil.

Bearing elements made in accordance with the invention have a multiplicity of uses, for example, sleeve bearings, inserts for rod end bearings, cages for ball or roller bearing assemblies, etc. If additional mechanical strength or spring back characteristics are desired, as is often desirable in various types of annular shaped bearings, glass fibers or strands can be embedded in the bearing body during the molding operation. It is preferable to first thoroughly coat the glass fibers or strands with graphite-phenolic resin mixture, prepared similarly as described above. The fibers or strands so coated are easily and thoroughly wetted by and bonded to the bearing mixture upon molding. Ideally such reinforcement should be in the form of a strand or strands of intertwisted glass fibers, the strand or strands being spaced from the low friction surface of the bearing. Where the bearing is of annular shape, the strand or strands are wrapped to a spiral or annulus about which the mixture is molded.

It will be understood that while the invention has been described in detail with reference to preferred embodiments thereof various modifications may be made all within the full and intended scope of the claims which follow.

We claim:
1. A bearing element having a low friction surface shaped for bearing engagement with the surface of another member, at least the low friction surface portion of said element comprising finely divided thermoplastic organic resin having good inherent lubricity embedded in an organic resin bonded matrix containing finely divided reinforcing material and heat conductive material, said thermoplastic organic resin being softer than the organic resin of said matrix.

2. A bearing as set forth in claim 1 wherein said reinforcing material is absorbent and contains absorbed lubricating oil.

3. A bearing element comprising a molded body having a low friction surface shaped for bearing engagement with the surface of another member, said body comprising polytetrafluoroethylene flock embedded in an organic resin bonded matrix containing finely divided reinforcing material and heat conductive material, said organic resin bonded matrix being harder than the polytetrafluoroethylene flock.

4. A bearing element as set forth in claim 3 wherein said flock constitutes from about 20% to 25% by weight of the body.

5. A bearing element comprising a molded body having a low friction surface shaped for bearing engagement with the surface of another member, said body comprising polytetrafluoroethylene flock embedded in a phenolic resin bonded matrix containing finely divided asbestos and graphite.

6. A bearing element having a low friction surface shaped for bearing engagement with the surface of another member, at least the low friction surface portion of said element comprising about 25% to 40% by weight relatively hard organic resin, about 5% to 10% by weight graphite, about 30% to 50% by weight finely divided heat resistant reinforcing material, and about 20% to 50% by weight finely divided relatively soft lubricative thermoplastic resin, said graphite, said reinforcing material and said relatively soft resin being uniformly dispersed in said relatively hard resin.

7. A bearing element as set forth in claim 6 wherein said relatively hard organic resin is a thermosetting resin, and said thermoplastic resin is polytetrafluoroethylene.

8. A bearing element comprising a molded body having a low friction surface shaped for bearing engagement with the surface of another member, said molded body comprising about 25% to 40% by weight phenolformaldehyde, about 5% to 10% by weight flake graphite, about 30% to 50% by weight finely divided asbestos, and about 20% to 25% by weight polytetrafluoroethylene flock, said graphite, asbestos and polytetrafluoroethylene flock being uniformly dispersed in said phenolformaldehyde.

9. A bearing element comprising a molded body having a low friction surface shaped for bearing engagement with the surface of another member, said body comprising about 35% by weight phenolic resin, about 5% by weight flake graphite, about 38% by weight finely divided asbestos, and about 22% by weight polytetrafluoroethylene flock, said graphite, asbestos and polytetrafluoroethylene flock being uniformly dispersed in said phenolic resin.

10. A method for manufacturing a bearing comprising the steps of: forming a uniform mixture of about 25% to 40% by weight thermosetting organic resin, 5% to 10% by weight powdered high heat conductive material, 30% to 50% by weight finely divided heat resistant reinforcing material and 20% to 25% by weight finely divided lubricative thermoplastic organic resin; and then molding the mixture and heat curing the thermosetting resin to form a bearing element of predetermined shape, said lubricative thermoplastic organic resin having a softening temperature which is higher than the temperature used for molding and heat curing and being softer than the cured thermosetting resin.

11. A method as set forth in claim 12 and wherein after said molding and curing steps, said bearing element is immersed while heated in a lubricating oil.

12. A method for manufacturing a bearing comprising the steps of: forming a uniform mixture of about 35% by weight phenolic resin, 5% by weight flake graphite, 38% by weight asbestos and 22% by weight polytetrafluoroethylene flock; and then molding said mixture and heat curing said phenolic resin.

13. A method for manufacturing a bearing comprising the steps of: forming a uniform mixture of about 25% to 40% by weight thermosetting organic resin, 5% to 10% by weight finely divided graphite, 30% to 50% by weight finely divided heat resistant reinforcing material and 20% to 25% by weight finely divided lubricative thermoplastic organic resin, said resin and said graphite being mixed together before mixing said reinforcing material and said thermoplastic resin therewith, and then molding the mixture and heat curing the thermosetting resin to form a bearing element of predetermined shape, said lubricative thermoplastic organic resin having a softening temperature which is higher than the temperature used for molding and heat curing and being softer than the cured thermosetting resin.

References Cited

UNITED STATES PATENTS

| | | | |
|---|---|---|---|
| 2,326,000 | 8/1964 | Teeple | 260—38 |
| 2,400,091 | 4/1946 | Alfthan | 252—12.2 |
| 2,581,301 | 1/1952 | Saywell | 260—38 |
| 2,672,443 | 3/1954 | Screnock | 260—38 |
| 2,691,814 | 10/1954 | Tait | 252—12.2 |
| 2,748,030 | 5/1956 | Silversher | 260—38 |
| 3,238,601 | 3/1966 | White | 260—38 |

ALLAN LIEBERMAN, Primary Examiner

R. BARON, Assistant Examiner

U.S. Cl X.R.

252—12, 12.2, 12.4; 260—37, 38, 41